(12) United States Patent
Gesell et al.

(10) Patent No.: US 9,427,812 B2
(45) Date of Patent: Aug. 30, 2016

(54) CUTTING INSERT FOR TOOTH CUTTERS

(75) Inventors: Reinhold Friedrich Gesell, Weihenzell (DE); Rene Schumann, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 169 days.

(21) Appl. No.: 13/541,824

(22) Filed: Jul. 5, 2012

(65) Prior Publication Data
US 2013/0022417 A1    Jan. 24, 2013

(30) Foreign Application Priority Data
Jul. 18, 2011 (DE) .................. 10 2011 107 789

(51) Int. Cl.
*B23C 5/20* (2006.01)
*B23F 21/14* (2006.01)
*B23C 5/00* (2006.01)

(52) U.S. Cl.
CPC ............. *B23C 5/207* (2013.01); *B23F 21/146* (2013.01); *B23C 2200/123* (2013.01); *B23C 2200/125* (2013.01); *B23C 2200/203* (2013.01); *B23C 2200/367* (2013.01); *B23C 2220/36* (2013.01); *Y10T 407/23* (2015.01)

(58) Field of Classification Search
CPC ............. B23C 3/04; B23C 2200/123; B23C 2200/125; B23C 2200/203; B23C 2200/26367; B23C 2200/36
USPC .................................. 407/113, 114, 115, 116
See application file for complete search history.

(56) References Cited

U.S. PATENT DOCUMENTS

| 1,154,754 A | 9/1915 | Gandy |
| 5,639,189 A * | 6/1997 | Hoefler .................. 407/113 |
| 6,074,137 A * | 6/2000 | Betman et al. ............ 407/103 |
| 6,227,772 B1 * | 5/2001 | Heinloth et al. .......... 407/113 |
| 6,238,146 B1 * | 5/2001 | Satran et al. ............. 407/113 |
| 6,974,280 B2 * | 12/2005 | Satran et al. .............. 407/42 |
| 7,357,603 B2 * | 4/2008 | Hoefler et al. ............ 407/66 |
| 8,202,026 B2 * | 6/2012 | Satran et al. ............. 407/113 |
| 8,454,278 B2 * | 6/2013 | Hartlohner et al. ....... 407/113 |
| 2010/0202839 A1 | 8/2010 | Fang et al. |
| 2013/0302099 A1 * | 11/2013 | Choi et al. ............... 407/113 |

FOREIGN PATENT DOCUMENTS

| CN | 200991794 Y | 12/2007 |
| CN | 101878083 A | 11/2010 |
| EP | 0582981 A | 2/1994 |
| EP | 0582981 A1 | 2/1994 |
| EP | 2119520 A | 11/2009 |
| EP | 2198997 A | 5/2012 |
| GB | 1154754 A | 6/1969 |
| JP | 2008229744 A | 2/2008 |
| WO | WO2010073681 A1 | 7/2010 |

OTHER PUBLICATIONS

Sep. 28, 2015—First Office Action.

* cited by examiner

Primary Examiner — Will Fridie, Jr.
(74) Attorney, Agent, or Firm — Matthew S. Bedsole

(57) ABSTRACT

A cutting insert for tooth cutters includes a substantially cuboid basic body. The basic body has two top surfaces on sides opposite each other. The basic body also has four circumferential surfaces which extend in each case from an edge portion of the one top surface to an edge portion of the other top surface. A cutting edge is formed at at least one transition from each circumferential surface to one of the top surfaces.

9 Claims, 2 Drawing Sheets

CUTTING INSERT FOR TOOTH CUTTERS

CLAIM TO PRIORITY

This application is a National entry application of German Application No. 102011107789.1, filed on Jul. 18, 2011, the entire contents of which is incorporated herein by reference.

FIELD OF THE INVENTION

The invention relates to a cutting insert, in particular for tooth cutters.

BACKGROUND OF THE INVENTION

Tooth cutters are milling cutters, by means of which an external or internal toothing can be produced on a workpiece. Tooth cutters with interchangeable cutting inserts allow for a large amount of variability in the form of the toothing.

On account of the rapid wear of the cutting edges, the number of required cutting inserts is relatively high, which leads to increased costs. Consequently, there is a need for better utilization of the cutting inserts.

WO 2010/073681 A1 makes known a cutting insert with a plate-shaped basic body and a cutting edge which is formed at the transition from a lateral cutting face to an upper top surface of the basic body. When looking at the basic body from the side, the cutting edge describes an involute. The cutting face inclines inward from the upper to the lower top surface of the basic body, a surface portion of the basic body protruding on the outer periphery being realized as a concave surface. Said surface corresponds to a portion of the surface area of a cone.

SUMMARY OF THE INVENTION

It is the object of the invention to provide a cutting insert, in particular for tooth cutters, which can be used in a more efficient manner than the cutting inserts known up to now.

This object is achieved by a cutting insert with the features of claim 1. Advantageous and expedient developments of the cutting insert according to the invention are provided in the associated sub-claims.

The cutting insert according to the invention is provided in particular for tooth cutters and comprises a substantially cuboid basic body. The basic body has two top surfaces on sides opposite each other. The basic body also has four circumferential surfaces which extend in each case from an edge portion of the one top surface to an edge portion of the other top surface. According to the invention, a cutting edge is formed at at least one transition from each circumferential surface to one of the top surfaces.

The invention is based on the knowledge that cutting edges can be provided not only on one or on two circumferential surfaces of a cuboid basic body, but on all four circumferential surfaces. The increased number of usable cutting edges per cutting insert allows for more rational and consequently more economic use of the cutting inserts.

So that all the cutting edges of the cutting insert according to the invention can be used one after the other without a large amount of additional expenditure, one configuration of the cutting insert is advantageous where the basic body has a cuboid base. The cutting insert then only has to be rotated by 90° once one cutting edge becomes worn so that the next cutting edge is used.

In the case of the preferred embodiment of the cutting insert according to the invention, a cutting edge is formed at each transition from a circumferential surface to a top surface such that the cutting insert has a total of eight cutting edges. By means of turns and 90° rotations, all eight cutting edges of the cutting insert can be put to use one after the other.

The two top surfaces preferably have in each case four edge portions of the same length, wherein in particular the angles between two adjacent edge portions are the same in each case.

Straight cutting edges are less suitable or absolutely not suitable for certain applications. Consequently, according to a preferred configuration of the cutting insert it is provided that the top surfaces descend toward the associated cutting edges such that the cutting edges are curved.

The cutting edges preferably have a radius within the range of between approximately 90 mm and approximately 500 mm.

It is not only the multiple usability through the provision of multiple cutting edges that contributes to the efficiency of cutting inserts, but also the production of the cutting inserts. In particular, it should be possible to carry out the forming of the cutting edges with as few operating steps as possible. According to a particularly preferred embodiment of the cutting insert according to the invention, a passage opening extends from the one top surface to the other top surface, and the top surfaces have a conical surface portion, wherein the center axis of the cone coincides with the center axis of the passage opening and the conical surface portion is not interrupted in the circumferential direction with reference to the center axis of the cone. Such an advantageous configuration makes it possible to produce all cutting edges associated with one top surface in one single operating step. To this end, the cutting insert is clamped in a grinding tool with the aid of the central passage opening such that it can be rotated about the center axis of the passage opening. In this way, the entire conical surface portion with all associated cutting edges can be ground by the cutting insert being rotated by at least 360° in relation to a grinding surface which is set in a slightly inclined manner, without the cutting insert having to be removed from the tool and re-clamped. The cutting insert has to be turned once just for the production of the conical surface portion and the cutting edges on the opposite side of the basic body.

Different cutting contours can be realized depending on the inclination of the conical surface portion. Preferred cutting geometries are produced in the case of an inclination of the conical surface portion at a maximum angle of approximately 5° in relation to a plane which is at right angles to the center axis of the passage opening.

An angle of inclination of a maximum of 3° is sufficient for the majority of intended applications; it is preferably in the order of magnitude of 2°.

For the design of the cutting insert as an indexable insert, it is advantageous for the two top surfaces to have a planar supporting portion which surrounds the passage opening. Thanks to the two supporting portions, the cutting insert can be clamped against a seat in the tooth cutter even after being turned.

A further preferred configuration of the cutting insert provides that the cutting edges are set back in relation to the associated circumferential surface, preferably by approximately 0.1 mm.

Special machining of the edges between the circumferential surfaces, where a bevel surface, which is aligned at an angle of 45° with respect to the associated circumferential surfaces, is formed between two adjacent cutting edges, allows for an ordered overlapping of several cutting inserts arranged one behind the other in the tooth cutter for a high cutting accuracy and surface quality.

BRIEF DESCRIPTION OF THE DRAWINGS

Further features and advantages of the invention emerge from the following description and from the attached drawings, to which reference is made and in which.

DETAILED DESCRIPTION OF THE INVENTION

Figure 1:
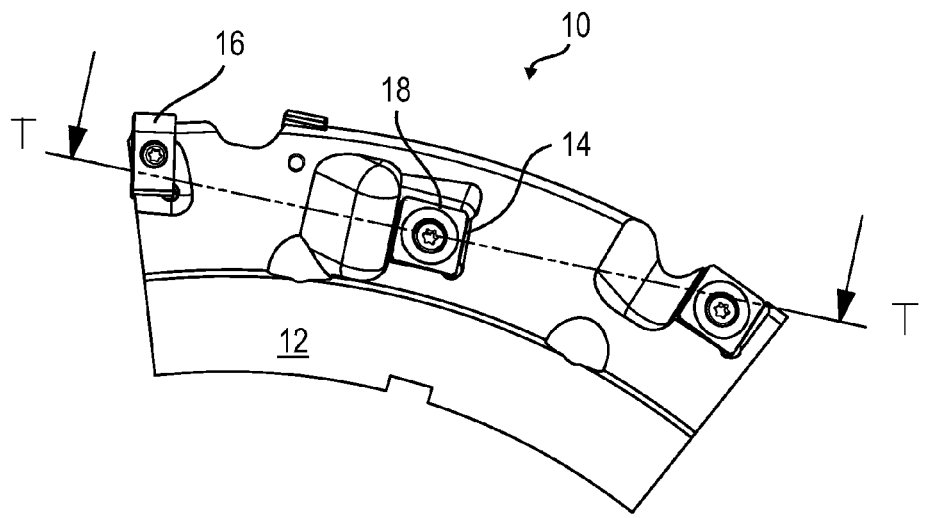
FIG. 1 shows a side view of a cutout of a tooth cutter with cutting inserts according to the invention.
Figure 2:
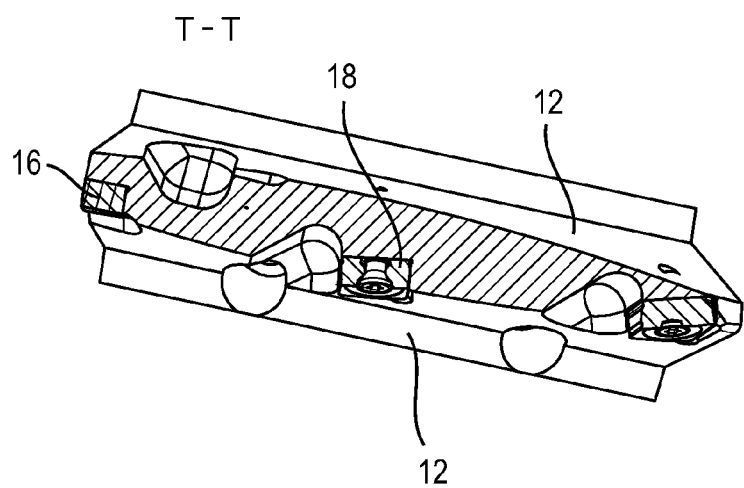
FIG. 2 shows a sectional view along the line of intersection T-T in FIG. 1.

FIG. 1 shows a representative sector of a substantially disk-shaped tooth cutter 10. As can also be seen from FIG. 2, the two side walls 12 of the tooth cutter 10 have seats realized as receiving pockets 14 for the reception of cutting inserts. In the exemplary embodiment shown, both tooth tip machining cutting inserts 16 and tooth profile machining cutting inserts 18, which are set in each case in an inclined manner with respect to the center plane of the tooth cutter 10, are arranged in the circumferential direction of the tooth cutter 10.

Figure 3:
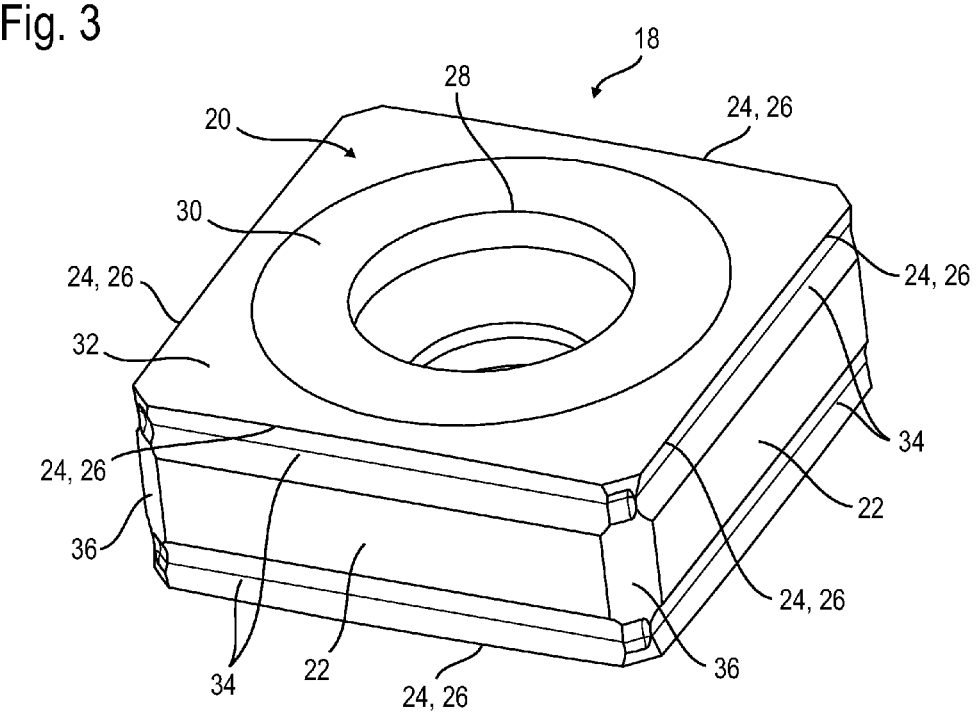
FIG. 3 shows a perspective view of a cutting insert according to the invention.
Figure 4:
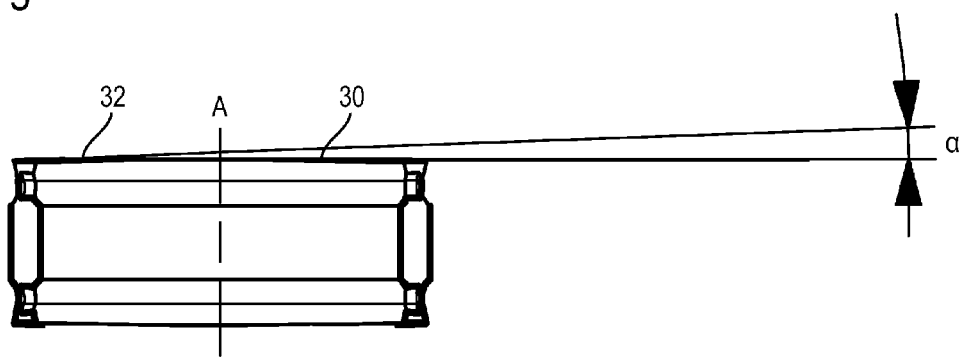
FIG. 4 shows a side view of the cutting insert from FIG. 3.

The following explanations relate only to the cutting inserts 18 for tooth profile machining, one cutting insert 18 of which is shown on its own in FIGS. 3 and 4.

The cutting insert 18 has a substantially cuboid basic body with a cuboid base. The basic body is defined by two top surfaces 20 on sides opposite each other and four circumferential surfaces 22. Each circumferential surface 22 extends from an edge portion 24 of the one top surface 20 to an edge portion 24 of the other top surface 20. A cutting edge 26 is formed at at least one transition from each circumferential surface 22 to one of the top surfaces 20, i.e. each circumferential surface 22 borders on one or two cutting edges 26. In the exemplary embodiment shown, each such transition is realized as a cutting edge 26 such that the cutting insert 18 has a total of eight cutting edges.

A central passage opening 28 extends from the one top surface 20 completely through the basic body of the cutting insert 18 as far as up to the other top surface 20. A dowel pin or a clamping bolt can be inserted through the passage opening 28 in order to fasten the cutting insert 18 on the tooth cutter 10.

The passage opening 28 surrounds a planar supporting portion 30 on both sides of the cutting insert basic body. By way of one of the two supporting portions 30, in the mounted state the cutting insert 18 abuts against the bottom of the receiving pocket 14 with its inactive side. Said supporting portion 30 consequently supports the cutting insert 18 in relation to the receiving pocket 14. As a supporting portion 30 is provided on both sides of the basic body, the cutting insert 18 can also be mounted such that the other supporting portion 30 abuts against the bottom of the receiving pocket 14.

In the exemplary embodiment shown, the cutting insert 18 is point-symmetric with reference to its center point. In particular, the four edge portions 24 of the top surfaces 20 in each case are of the same length, and the angles between two adjacent edge portions 24 are all the same.

One characteristic feature in the case of the two top surfaces 20 is that they have a non-planar surface portion 32 which extends from the supporting portion 30 to all the edge portions 24 of the top surface 20. The surface portion 32 descends toward the associated four cutting edges 26 such that the cutting edges 26 have a curved profile. The radius of the cutting edges 26 is within a range of between approximately 90 mm and approximately 500 mm.

The surface portion 32 is produced by grinding off the top surface 20 by means of a grinding surface which is set in a slightly inclined manner with reference to the supporting portion 30 by the cutting insert 18 being rotated about its center axis A which extends through the passage opening 28. As a result, the surface portion 32 obtains a conical form, i.e. the surface portion 32 corresponds to the surface area of a truncated cone, the center axis of which coincides with the center axis A of the passage opening 28. The conical surface portion 32 is not interrupted in the circumferential direction with reference to the center axes.

In relation to a plane which is at right angles to the center axis A of the passage opening, the conical surface portion 32 is inclined at a maximum angle $\alpha$ of approximately 5°. Said inclination of the conical surface portion 32 can be seen in particular from FIG. 4. The angle of inclination a corresponds to the angle between the base and the surface area of the previously mentioned virtual truncated cone. In the case of the preferred embodiments of the cutting insert 18, the angle $\alpha$ is a maximum of 3° and is preferably in the order of magnitude of 2°.

In the region of the circumferential surfaces 22, clamping steps 34 are integrally molded into the basic body, in particular by means of pressing, in each case adjoining the cutting edges 26. The associated cutting edges 26 are set back in relation to the remaining circumferential surface 22 by approximately 0.1 mm.

In addition, in each case a bevel surface 36, which is aligned at an angle of 45° with respect to the two adjoining circumferential surfaces 22, is provided between two adjacent cutting edges 26.

On account of the cuboid basic body with a cuboid base and the almost cuboid top surfaces 20 and the design as an indexable insert with two supporting portions 30 on opposite sides, the cutting insert 18 with its positive clamping geometry can be both turned and mounted in orientations rotated about the center axis A in each case by 90° such that all eight cutting edges 26 can be put to use one after the other.

What is claimed is:

1. A cutting insert having a substantially cuboid basic body, which has two top surfaces on sides opposite each other and four substantially planar flank surfaces which extend in each case from an edge portion of the one top surface to an edge portion of the other top surface, wherein a cutting edge is formed at an intersection with each substantially planar flank surface and at least one of the top surfaces, and wherein a passage opening extends from the one top surface to the other top surface, and the top surfaces have a planar supporting portion with an inner periphery and an outer periphery, the inner periphery surrounds the passage opening and a non-planar surface portion corresponding to a surface of a truncated cone that extends radially outward from the outer periphery of the planar supporting portion to each cutting edge, and wherein the center axis of the truncated cone coincides with the center axis A of the passage opening and the non-planar surface portion is continuous in the circumferential direction with reference to the center axis of the cone, and wherein the non-planar surface portion descends toward an associated cutting edge such that the associated cutting edge is curved.

2. The cutting insert as claimed in claim 1, wherein the basic body has a cuboid base.

3. The cutting insert as claimed in claim 1, wherein the cutting insert has a total of eight cutting edges.

4. The cutting insert as claimed in claim 1, wherein the two top surfaces have in each case four edge portions of the same length, and wherein angles between two adjacent edge portions are the same in each case.

5. The cutting insert as claimed in claim 1, wherein the non-planar surface portion is inclined at a maximum angle of approximately 5° in relation to a plane which is at a right angle to the center axis A of the passage opening.

6. The cutting insert as claimed in claim 1, wherein the cutting edges have a radius within the range of between approximately 90 mm and approximately 500 mm.

7. The cutting insert as claimed in claim wherein the maximum angle is 3°.

8. The cutting insert as claimed in claim 1, wherein the cutting edges are set back in relation to the associated flank surface by approximately 0.1 mm.

9. The cutting insert as claimed in claim 1, wherein a bevel surface, which is aligned at an angle of 45° with respect to the flank surfaces, is provided between two adjacent cutting edges.

\* \* \* \* \*